United States Patent
Jernigan

[11] Patent Number: 6,125,739
[45] Date of Patent: Oct. 3, 2000

[54] DEVICE FOR SUPPORTING AND STEAMING FOWL

[76] Inventor: Steven C. Jernigan, 160 Beacon La., Atmore, Ala. 36502

[21] Appl. No.: 09/399,831

[22] Filed: Sep. 21, 1999

[51] Int. Cl.[7] .............................. A47J 37/00; A47J 37/04; A47J 43/18
[52] U.S. Cl. ................................ 99/345; 99/347; 99/415; 99/417; 99/418; 99/419; 99/426; 99/446
[58] Field of Search ...................... 99/345–347, 415–418, 99/419–421 V, 425, 426, 444–450, 401; 211/181.1; 426/509, 523

[56] References Cited

U.S. PATENT DOCUMENTS

| | | | |
|---|---|---|---|
| 3,392,665 | 7/1968 | Harnest | 99/419 X |
| 4,450,759 | 5/1984 | Steibel | 99/426 |
| 4,557,188 | 12/1985 | Spanek | 99/415 |
| 4,633,773 | 1/1987 | Jay . | |
| 4,709,626 | 12/1987 | Hamlyn | 99/345 X |
| 4,924,768 | 5/1990 | Jay . | |
| 5,008,508 | 4/1991 | Skerker et al. . | |
| 5,069,117 | 12/1991 | Schlessel . | |
| 5,081,916 | 1/1992 | Kuhling et al. | 99/419 |
| 5,106,642 | 4/1992 | Ciofalo . | |
| 5,301,602 | 4/1994 | Ryczek | 99/345 |
| 5,501,142 | 3/1996 | Bailey | 99/345 X |
| 5,538,050 | 7/1996 | Galdon | 99/426 X |
| 5,575,198 | 11/1996 | Lowery | 99/426 |
| 5,662,028 | 9/1997 | Fraga | 99/419 |
| 5,791,235 | 8/1998 | Anselmo | 99/426 |
| 5,842,409 | 11/1998 | Loffler | 99/426 X |

*Primary Examiner*—Timothy Simone
*Attorney, Agent, or Firm*—Kenneth L Tolar

[57] ABSTRACT

A device for supporting and steaming fowl within a cooking appliance such as a grill or smoker includes a substantially circular base member having a planar upper and lower surfaces. Extending from the upper surface is a frustoconical insert having an open top in communication with an interior fluid receiving chamber. The open top is coverable with a removable cap member. The insert includes a plurality of perforations in communication with the interior chamber. The insert is placed into the abdominal cavity of the fowl whereby the base member supports the fowl in an upright position when placed on a cooking surface. Steam produced within the interior fluid chamber is gradually disbursed to the cavity via the perforations to prevent the fowl from drying.

4 Claims, 1 Drawing Sheet

DEVICE FOR SUPPORTING AND STEAMING FOWL

BACKGROUND OF THE INVENTION

The present invention relates to a device for supporting and steaming fowl such as turkey or chicken.

DESCRIPTION OF THE PRIOR ART

Cooking whole chickens, turkeys and similar fowl on a barbeque grill, smoker or similar outdoor appliance is difficult. The fowl must typically be cooked for several hours often causing the fowl to be dry and tasteless. Furthermore, the lower side of the fowl is placed on a grill resulting in scorching and uneven cooking. The present invention overcomes the above described disadvantages by providing a device that supports fowl in an upright position within a cooking appliance so that the fowl cooks uniformly. Furthermore, the device steams the interior of the fowl to reduce cooking time and prevent drying.

Various devices for supporting fowl exist in the prior art. For example, U.S. Pat. No. 5,106,642 issued to Ciofalo relates to a roasting support for fowl including a base member having a generally conical, imperforate plug member that is inserted within the open end of a fowl to retain fluid within the fowl during roasting.

U.S. Pat. No. 5,069,117 issued Schlessel relates to a multi-purpose poultry roaster and baking rack.

U.S. Pat. No. 5,008,508 issued to Skerker et al. relates to a device for suspending a food product designed to expose a maximum surface area thereof to promote more uniform cooking. The device includes two reverseably engageable support members having depressions thereon.

U.S. Pat. No. 4,924,768 issued to Jay relates to a multi-purpose baking and roasting rack including a drip pan and a plurality of upwardly directed vertically oriented skewer rods positioned above the interior surface of the drip pan. Each rod pierces a food item to be baked or roasted.

U.S. Pat. No. 4,633,773 issued to Jay relates to a holder for roasting poultry including a detachable drip pan and a first bent wire clement interlocking with a second bent wire element whose ends are peripherally attached to the drip pan. The wires curve inwardly and upwardly.

U.S. Pat. No. 4,450,759 issued to Steibel relates to a stand for roasting fowl including two planar plates with slots therein for assembling the plates at right angles relative to each other.

As indicated above, various devices exist in the prior art for supporting fowl and other food items in an upright position. Most notably, the device disclosed in Ciofalo relates to a conical plug mounted above a base member for inserting into the cavity of the fowl. However, the device is not designed to simultaneously support and steam the fowl according to the present invention. Furthermore, the plug is mounted on a frame structure secured to the base member and is therefore complicated to manufacture and assemble. The present invention provides a unitary, free-standing frustoconical insert having an interior fluid chamber. The insert is placed into the fowl cavity to support the fowl in an upright position. The insert is perforated so that steam generated by fluid placed within the interior chamber will be dispensed to the fowl cavity thereby moistening the fowl.

SUMMARY OF THE INVENTION

The present invention relates to a device for supporting and steaming fowl. The device includes a substantially circular base member having planar upper and lower surfaces. Upwardly extending from the upper surface of the base member is a hollow, frustoconical insert having an open top. The insert includes an outer wall having a plurality of perforations thereon that are in communication with an interior chamber. A cap is removably attached to the open top of the insert which is removed to place fluid within the chamber. The insert is placed into the abdominal cavity of the fowl allowing the fowl to be supported in an upright position when the base member is placed on a cooking surface. Accordingly, as the fluid within the chamber is heated, steam is produced and is disbursed to the abdominal cavity thereby preventing the fowl from drying. It is therefore an object of the present invention to provide a device for uprightly supporting fowl within a cooking appliance.

It is another object of the present invention to provide a device that allows a user to conveniently steam the interior of fowl.

It is yet another object of the present invention to provide a device that assists a user in cooking fowl evenly and more efficiently.

Other objects, features and advantages of the present invention will become readily apparent from the following detailed description of the preferred embodiment when considered with the attached drawings and the appended claims.

DESCRIPTION OF THE PREFERRED EMBODIMENT

Figure 2:
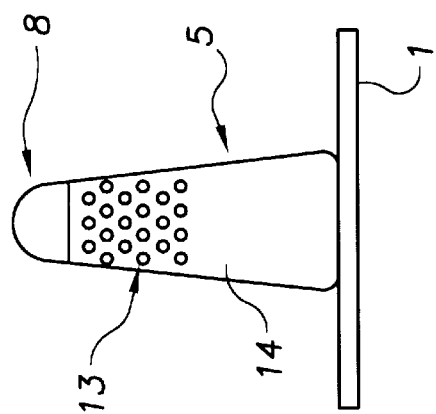
FIG. 2 is a side view of the device.

Fowl, such as turkeys and chickens typically include an opening leading to an internal abdominal cavity that is often stuffed with spices or other condiments. Referring now to FIGS. 1 through 4, the present invention relates to a device for supporting and steaming such fowl 3. The device comprises a substantially circular base member 1 having planar upper and lower surfaces. Upwardly extending from the upper surface of the base member is a hollow, frustoconical insert 5 having an interior chamber and an open top 15 in communication therewith. The insert is dimensioned to be tightly received within the opening and the abdominal cavity of the fowl. The insert includes an outer wall 14 having a plurality of perforations 13 thereon that are in communication with the interior chamber. The open top of the insert includes an internally threaded portion 7 for threadedly engaging an externally threaded portion 20 on a removable cap member 8.

Figure 4:
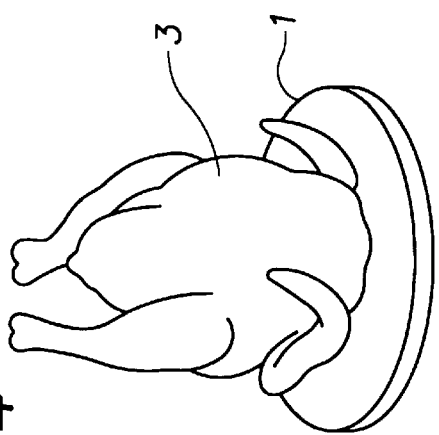
FIG. 4 depicts a fowl supported upright on the device.
Figure 1:
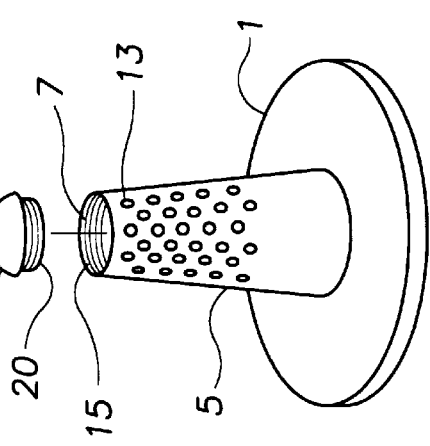
FIG. 1 is a perspective view of the device with the removable cap slightly offset therefrom.
Figure 3:
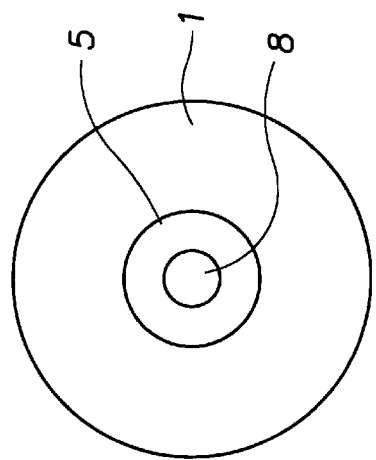
FIG. 3 is a top view of the device.

To use the above described device, a user removes the cap member and places a desired fluid, such as water or a marinade into the interior chamber of the insert. The cap is reattached and the insert is placed into the abdominal cavity of the fowl. The base member is then placed on a smoker, grill or other horizontal cooking surface to support the fowl in an upright position as depicted in FIG. 4. As the fluid within the interior chamber is heated to a predetermined temperature, steam is produced and dispensed via the perforations directly into the abdominal cavity of the fowl thereby preventing the fowl from drying.

The support device as described above is preferably constructed with aluminum or a similar durable, rust resistant material. However, as will be readily apparent to those skilled in the art, the size, shape and materials of construction may be varied without departing from the spirit of the present invention.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A device for supporting and steaming fowl comprising:

a base member having planar upper and lower surfaces;

an insert extending from the upper surface of said base member, said insert having an open top in communication with an interior chamber and an outer wall having a plurality of perforations thereon in communication with said interior chamber;

a cap removably attachable to the open top for selectively enclosing said interior chamber whereby a fluid is placed into said interior chamber, said cap is fastened to the top of said insert and said insert is placed into an abdominal cavity of a fowl so that said device uprightly supports said fowl while steaming the cavity thereof.

2. A device according to claim 1 wherein said insert is frustoconical, tapering inwardly from a lower end to the top so that said insert is tightly received within said cavity.

3. A device according to claim 2 wherein the open top end of said shaft includes an internally threaded portion for threadedly engaging an externally threaded portion on said cap.

4. A device according to claim 1 wherein said base member is substantially circular and planar and has a width substantially greater than the insert so as to prevent said insert from toppling when said insert is supporting a fowl.

* * * * *